United States Patent [19]

Silverwater

[11] Patent Number: 4,827,774
[45] Date of Patent: * May 9, 1989

[54] FLOW SENSING DEVICE

[75] Inventor: Bernard F. Silverwater, Plainview, N.Y.

[73] Assignee: Pall Corporation, Glen Cove, N.Y.

[*] Notice: The portion of the term of this patent subsequent to Aug. 25, 2004 has been disclaimed.

[21] Appl. No.: 87,763

[22] Filed: Aug. 21, 1987

Related U.S. Application Data

[63] Continuation-in-part of Ser. No. 755,020, Jul. 5, 1985, Pat. No. 4,688,433.

[51] Int. Cl.$^4$ .............................................. G01F 1/22
[52] U.S. Cl. .................................................. 73/861.53
[58] Field of Search ........... 73/861.52, 861.53, 861.47, 73/861.49

[56]  References Cited

U.S. PATENT DOCUMENTS

| | | | |
|---|---|---|---|
| 2,035,472 | 3/1936 | Hammond .............................. | 73/167 |
| 2,444,677 | 7/1948 | Rosenblum . | |
| 2,489,932 | 11/1949 | Rosenblum . | |
| 2,777,464 | 1/1957 | Mosely . | |
| 2,851,060 | 9/1958 | Fleischer et al. . | |
| 2,873,104 | 2/1959 | Horwood . | |
| 2,989,866 | 6/1961 | Widell et al. ........................... | 73/207 |
| 3,232,288 | 2/1966 | Krobath . | |
| 3,403,556 | 10/1968 | Koester .................................. | 73/207 |
| 3,483,733 | 12/1969 | Hinderer ................................ | 73/40 |
| 3,795,145 | 3/1974 | Miller .................................... | 73/213 |
| 3,989,037 | 11/1976 | Franetzki . | |
| 4,006,634 | 2/1977 | Billette et al. .......................... | 73/207 |
| 4,016,760 | 4/1977 | Taylor ................................... | 73/205 R |
| 4,083,245 | 4/1978 | Osborn .................................. | 73/207 |
| 4,193,301 | 3/1980 | Ferrentino ......................... | 73/861.53 |
| 4,235,105 | 11/1980 | Walters ............................. | 73/861.53 |
| 4,299,314 | 9/1981 | Geronime ......................... | 73/861.52 |
| 4,375,169 | 3/1983 | Torresin ........................... | 73/861.53 |
| 4,466,290 | 8/1984 | Frick ...................................... | 73/756 |

OTHER PUBLICATIONS

McGraw-Hill Encyclopedia of Science & Technology, Oct. 27, 1982, pp. 464–475, (Fifth Edition).

Primary Examiner—Stewart J. Levy
Assistant Examiner—Robert P. Bell
Attorney, Agent, or Firm—Leydig, Voit & Mayer

[57] ABSTRACT

A device for sensing fluid flow comprises a housing having an inlet and an outlet and defining a fluid flow channel between the inlet and the outlet, a first member disposed in the fluid flow channel and including at least one rigid portion, and a second member disposed in the fluid flow channel upstream from the first member and including at least one flexible portion, the flexible portion being elastically flexible between an initial position spaced from the rigid portion and defining a first effective flow area and a final position adjacent the rigid portion and defining a second effective flow area which exceeds the first effective flow area. The device includes pressure passages including a linking arrangement for conveying pressures to a pressure transducer from upstream and downstream of the second member, the pressure measurements being correlated to a fluid flow rate. The link arrangement protects the transducer from pressure surges. The pressure transducer may be disposed in the housing.

17 Claims, 3 Drawing Sheets

FLOW SENSING DEVICE

This application is a Continuation-In-Part of U.S. Patent Application Ser. No. 755,020, which was filed on July 5, 1985 and entitled "Flow Sensing Device" and which issued as U.S. Pat. No. 4,688,433.

TECHNICAL FIELD

The present invention relates to devices for sensing the flow of a fluid. In particular, it relates to flow sensing devices which develop a differential pressure in response to fluid flow.

DISCLOSURE OF THE INVENTION

Fluid is a generic term which encompasses both liquids and gases. Flow may be defined as the volume of fluid passing a location in a certain amount of time and may be expressed in terms such as gallons per minute or cubic feet per second. For many mechanical and chemical systems, it is important to be able to accurately sense fluid flow at some point in the system.

Many devices for sensing fluid flow are commonly available. For example, one type of device includes a rigid flow obstruction, such as a rigid plate with a hole in it, located within a pipe. The diameter of the hole is smaller than the inside diameter of the pipe. In accordance with certain physical laws, the pressure of the fluid flowing through the flow obstruction is less than the static pressure of the fluid flowing through the larger diameter pipe upstream of the flow obstruction. The difference between these two pressures is known as the differential pressure and the value of the differential pressure is related to the flow, i.e., a large flow yields a large differential pressure while a small flow yields a small differential pressure. Typically, this type of device further includes an arrangement for sensing the differential pressure, relating the differential pressure to the flow, and displaying the value of the flow.

While flow sensing devices with rigid flow obstructions are effective and reliable, they nonetheless have several undesirable characteristics. For example, due to the relationship between flow and differential pressure in these devices, low flows are difficult to accurately sense because of the low value of the differential pressure. Consequently, the range of flows which these devices can usefully is rather small, e.g., the maximum flow may be only about 5 to 10 times the minimum flow.

A general object of the present invention is to provide an improved flow sensor which has a wide flow range and yet is extremely reliable and effective. A further object is to provide such a flow sensor for use with a pressure transducer. A special object is to provide a flow sensor which protects the pressure transducer from pressure surges in the fluid to allow utilization of inexpensive, low pressure differential transducers for flow measurement. In one exemplary embodiment of the present invention, the pressure transducer is disposed within the pipe.

In accordance with the invention, a flow sensing device is provided which comprises a housing which has an inlet and an outlet and defines a fluid flow channel between them, a first member which is disposed in the fluid flow channel and includes at least one rigid portion, a second member which is disposed in the fluid flow channel upstream from the first member and includes at least one flexible portion, and communicating passages for conveying pressures from locations upstream and downstream of the second member to a pressure transducer. The flexible portion is elastically flexible between an initial position spaced from the rigid portion with its periphery generally spaced from the periphery of the channel to define a first effective flow area within the channel and a final position adjacent the rigid portion with its periphery generally spaced from the periphery of the channel to define a second effective flow area within the channel which exceeds the first effective flow area. At low flows, the flexible portion flexes elastically from its initial position, generating a differential pressure which allows the low flow to be accurately sensed. At high flows, greater than a predetermined velocity, the flexible portion is maintained securely against the rigid portion, allowing the high flow to be accurately sensed. Consequently, the flow range for the flow sensing device of the present invention is much larger than many conventionally available devices.

BRIEF DESCRIPTION OF THE DRAWINGS

In the accompanying drawings

BEST MODE FOR CARRYING OUT THE INVENTION

Figure 1:
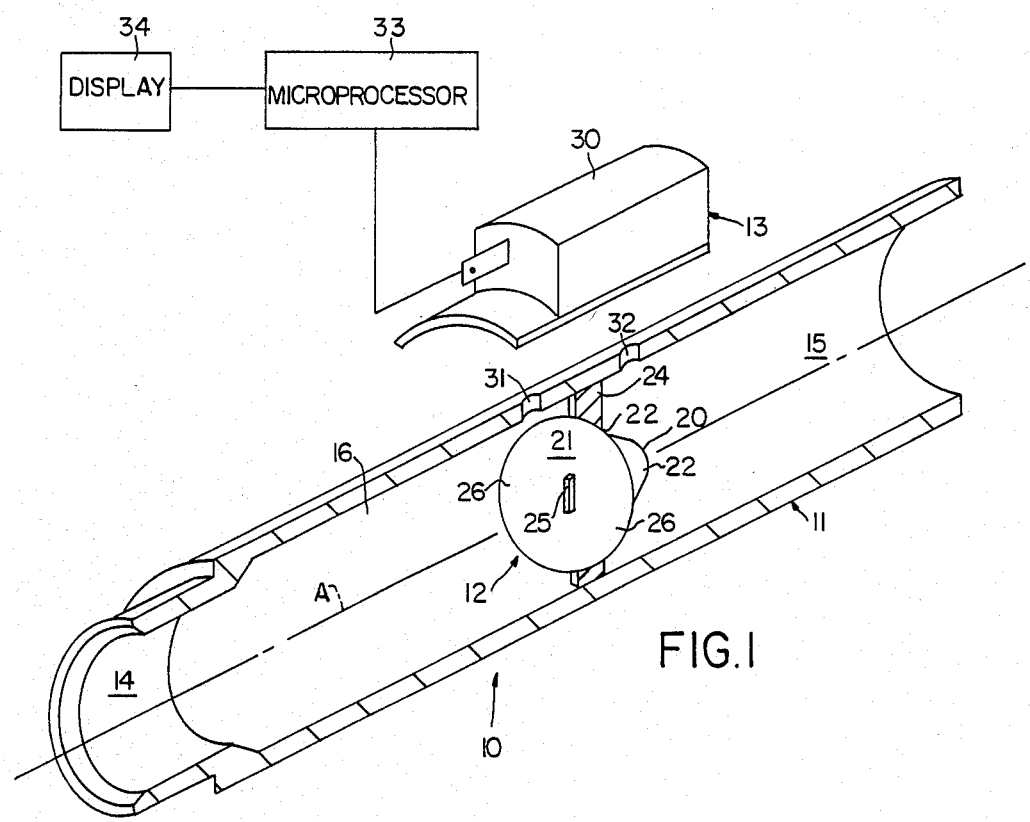
FIG. 1 is a partially sectional, partially exploded, and partially schematic perspective view of a first exemplary flow sensing device embodying the invention.
Figure 2:
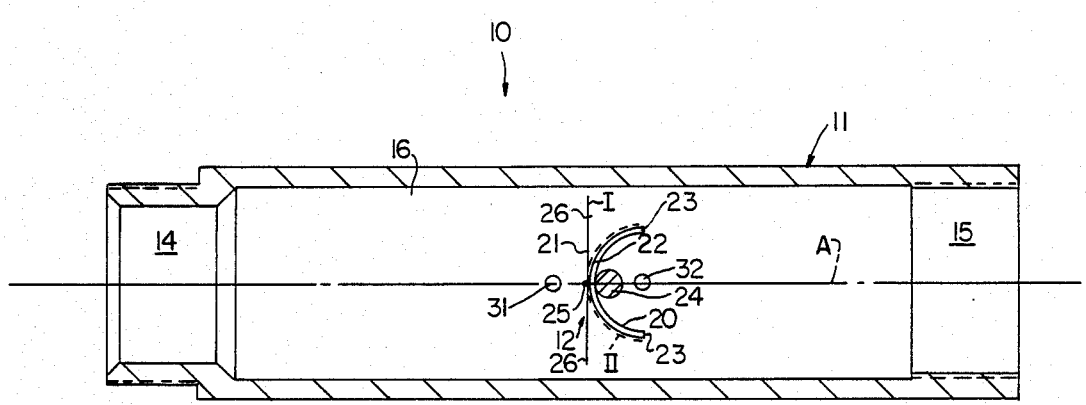
FIG. 2 is a sectional bottom view of the flow sensing device of FIG. 1.

As shown in FIGS. 1 and 2, a first exemplary flow sensing device 10 constructed and operated according to the present invention generally comprises a housing 11, a flow obstruction assembly 12, and a pressure sensing arrangement 13. The housing 11 has an inlet 14 and an outlet 15 and defines a fluid flow channel 16 between the inlet 14 and the outlet 15. While the housing may be fabricated from any suitably impervious material and fashioned in any appropriate configuration, the housing 11 of the first exemplary flow sensing device 10 is fabricated from aluminum and fashioned in a generally cylindrical configuration. Further, although the flow channel may be variously configured, the flow channel 16 of the first exemplary flow sensing device 10 extends coaxially between the inlet 14 and the outlet 15 and has a uniform, circular cross section Consequently, the general direction of fluid flow through the channel 16 is parallel to the channel axis A.

The flow obstruction assembly 12 is mounted to the housing 11 in the fluid flow channel 16 and, in accordance with one aspect of the invention, generally includes a rigid member 20 disposed downstream from a flexible member 21. Although the flow obstruction assembly may assume any suitable configuration, in the exemplary flow sensing device 10, the rigid member 20 comprises a plate having a generally U-shaped cross section of a specifically controlled local radius of curvature while the flexible member 21 comprises a thin circular disc. The thinness of the flexible member 21 may be uniform or non-uniform, for example, it may taper toward the edge.

The rigid member 20, which may be fabricated from aluminum, is preferably mounted symmetrically within the flow channel 16 with the bight 22 of the U-shaped rigid member 20 lying generally normal to the direction of flow and the legs 23 extending downstream oblique to the direction of flow. The rigid member 20 may be fixed within the flow channel 16 by any appropriate means, e.g., by welding the rigid member 20 to the housing 11. In the first exemplary flow sensing device 10, the rigid member 20 is attached to a pin 24. The pin 24 is attached at both ends to the housing 11 and extends along the downstream side of the bight 22 perpendicularly through the channel axis A.

The thin circular disc of the flexible member 21 preferably is fashioned from stainless steel and has a diameter somewhat less than the inside diameter of the housing 11. The diameter and thinness of the flexible disc member 21 may be selected to yield a desired response to flow, thinner and larger diameter members 21 being more responsive to lower flows. The flexible disc member 21 of the first exemplary flow sensing device 10 is preferably mounted coaxially within the channel 16 normal to the direction of flow and proximate to the rigid member 20. For example, the flexible member 21 may be joined to the bight 22 of the rigid member 20 by a staple 25 which extends through the rigid member 20 into the pin 24, fixing the rigid member 20 to the pin 24 as well. The wings 26 of the flexible disc member 21, i.e., the portions of the flexible disc member 21 away from the bight 22 of the rigid member 20, remain free to flex between an initial position I normal to the direction of flow and a final position II adjacent the legs 23 of the rigid member 20.

The pressure sensing arrangement 13 may comprise any suitable, well-known pressure transducer capable of sensing a differential pressure within the flow channel 16 caused by flow past the flexible member 21. Thus, the transducer senses a pressure difference between a higher pressure region in the channel 16, upstream of the flexible member 21, and a lower pressure region downstream of the flexible member 21, and provides an electrical signal which corresponds to the differential pressure. For example, in the first exemplary flow sensing device 10, the pressure sensing arrangement 13 may include a conventional pressure transducer 30 mounted to the outside of the housing 11 and two apertures 31, 32 in the housing 11 which allow fluid pressure to be communicated between the channel 16 and the pressure transducer 30. The first aperture 31 is located upstream from the flow obstruction assembly 12 and communicates with the upstream higher pressure region. More specifically the first aperture 31 is preferably located slightly ahead of the flexible member 21 and in the plane defined by the channel axis A and the pin 24.

The second aperture 32 may be located in various locations near the flow obstruction assembly 12 where the pressure drops due to fluid flow around the obstruction assembly 12, i.e., the downstream lower pressure region. In the first exemplary flow sensing device 10, the second aperture 32 is preferably disposed slightly behind the pin 24 but in the same plane and on the same side of the housing 11 as the first aperture 31. The pressure transducer 30 may be connected to any conventional device for correlating the differential pressure with the flow and displaying the flow. For example, the electrical signal output by the pressure transducer 30 may be supplied via an electrical signal conducting wire 50 to a microprocessor 33 which correlates the signal with the appropriate flow and drives a display 34, such as an LED display, to indicate the flow.

Figure 3:
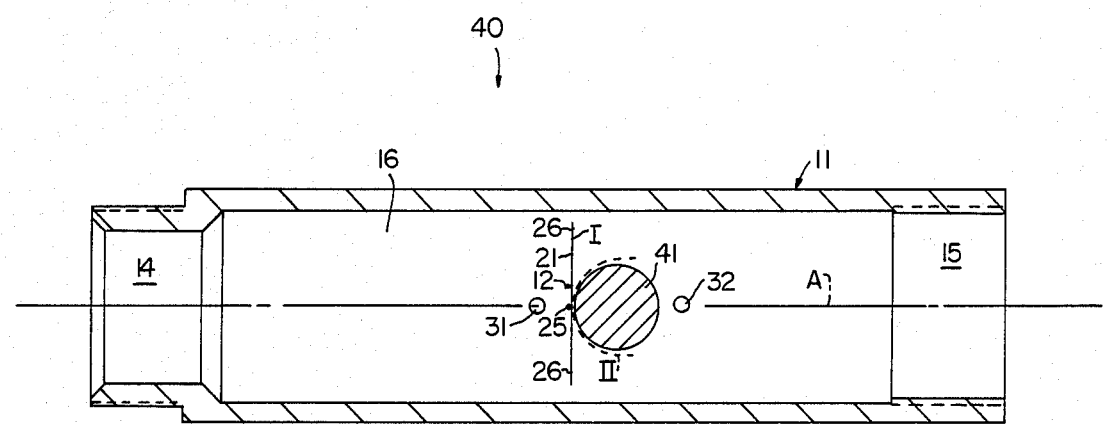
FIG. 3 is a sectional bottom view of a second exemplary flow sensing device embodying the invention.

A second exemplary flow sensing device 40 is shown in FIG. 3. It is similar to the first exemplary flow sensing device 10 except that a larger pin 41 serves as both the mounting pin 24 and the U-shaped rigid member 20 of the first exemplary flow sensing device 10. The larger pin 41 may have any suitable configuration with an upstream surface sufficient to limit the curvature of the flexible member 21 to a value which will delay failure due to fatigue caused by flexing. For example, in the second exemplary flow sensing device 40, the larger pin 41 has a circular cross section with a large enough diameter to provide an upstream surface which will limit the minimum bend radius of the flexible disc member 21, delaying fatigue. The center of the flexible member 21 may be mounted directly to the pin 41, for example, by means of the staple 25, the wings 26 remaining free to flex between an initial position I normal to the direction of flow and a final position II adjacent much of the upstream surface of the pin 41.

The preferred mode of operation of both exemplary flow sensing devices 10, 40 is similar. For example, the first exemplary flow sensing device 10 may be installed in a hydraulic or pneumatic system by means of the threaded fittings on the inlet 14 and the outlet 15. Fluid flowing from the inlet 14 to the outlet 15 past the flow obstruction assembly 12 develops a differential pressure within the channel 16. In the exemplary flow sensing device 10, the flow obstruction assembly 12 is mounted in the center of the channel 16 and forces the fluid toward the periphery of the channel 16. This not only limits stress on the flexible member 21 but also allows for higher flows in a specific envelope at an equal pressure drop than conventional orifice devices.

For low flows, the wings 26 of the flexible member 21 flex elastically downstream from the initial position I. The effective flow area around the flow obstruction assembly 12 increases as the wings 26 flex from the initial position I toward the final position II, attaining a maximum at the final position II at some predetermined flow velocity. Further, the force required to elastically flex the wings 26 increases with the magnitude of flexion from the initial position I. Consequently, at low flows, the exemplary flow sensing device 10 acts as a variable area flow sensor in which small changes in flow produce easily detectable changes in differential pressure, allowing very low flows to be accurately sensed. The low end of the useful flow range is defined at least in part by the effective flow area with the flexible member in the initial position I, e.g., as determined by the diameter of the flexible disc member 21, and by the modulus of elasticity of the flexible member, e.g., as determined by the thickness of the flexible disc member.

For high flows, the wings 26 are maintained in the final position II adjacent the legs 23 of the rigid member 20. The rigid member 20 not only limits the minimum bend radius of the wings 26 but also dampens any flutter or angular distortion which may be caused, for example, by tubulent flow, flow surges, or fluid hammer. Unlike the first exemplary flow sensing device 10, the end portions of the wings 26 of the second exemplary flow sensing device 40 extend beyond the pin 41. Thus, the second exemplary flow sensing device 40 may be more susceptible to flutter but is also more easily and less expensively manufactured. Nonetheless, at high flows, both exemplary flow sensing devices 10, 40 act as a variable head flow sensor, allowing high flows to be accurately sensed. Since a flow sensing device according to the present invention acts as a variable area flow sensor at low flows and a variable head flow sensor at high flows, it is anticipated that the flow sensing device may have a useful flow range of about 500 to 1.

In the exemplary embodiments of FIGS. 1-3, The differential pressures developed by flow past the flow obstruction assembly 12 are communicated to the pressure transducer 30 by means of the first and second apertures 31, 32 in the channel wall. With the second aperture 32 in the preferred location slightly behind and in line with the pin 24, it is protected from eddy currents which may be caused by the pin 24 or the rigid member 20. In response to the differential pressure, the pressure transducer 30 generates an electrical signal proportional to the differential pressure. As previously described, the electrical signal may be supplied via the signal conducting wire 50 to a mechanism which correlates the signal to the flow and displays the flow, such as the microprocessor 33 and display 34 shown in FIG. 1.

Figure 4:
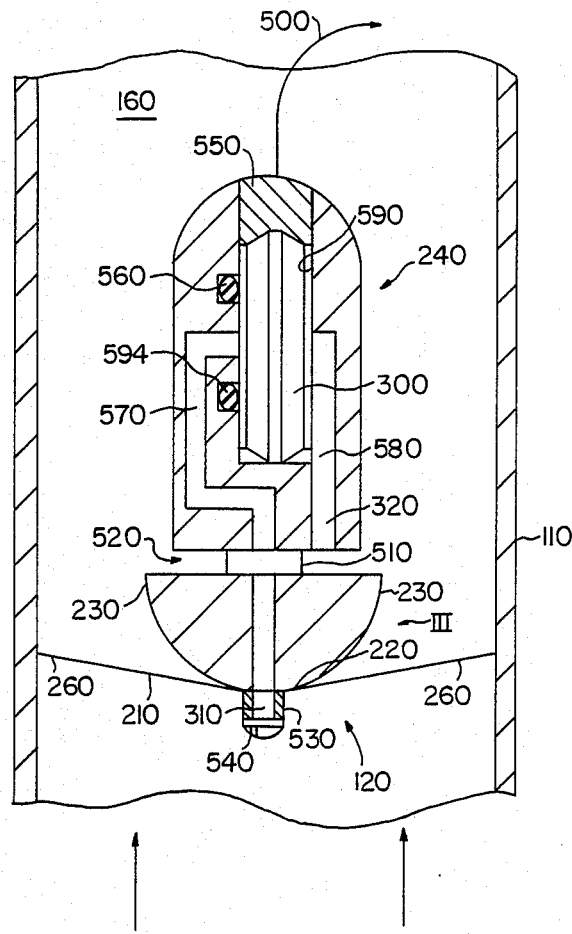
FIG. 4 is a sectional top view of a third exemplary flow sensing device employing the invention.
Figure 5:
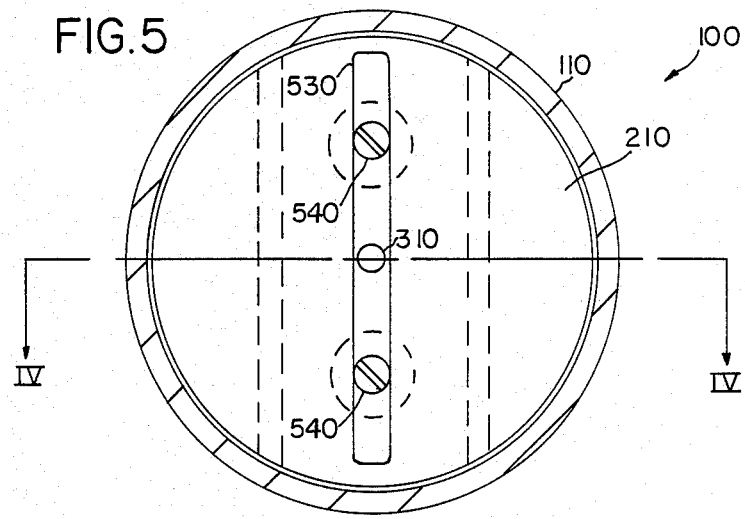
FIG. 5 is a front view looking downstream on the flow sensing device of FIG. 4.

A third exemplary embodiment of the present invention is shown in FIGS. 4 and 5. As in the previous embodiments, a flow sensing device 100 generally comprises a housing 110, a flow obstruction assembly 120, and a pressure sensing transducer arrangement. The housing 110 and the flexible member 210 of the flow obstruction assembly, for the purpose of illustration, are fashioned substantially the same as in the prior two embodiments, that is, the housing 110 is fashioned in a generally cylindrical configuration and the flexible member 210 comprises a thin circular disc having wings 260.

In a flow sensing device according to the present invention, the pressure sensing arrangement may be disposed within the flow channel 160. In the third illustrative embodiment, the pressure sensing arrangement comprises a pressure transducer 300 disposed within an appropriately configured mounting pin 240. To provide a suitable configuration for housing the transducer 300, the mounting pin 240 may be cast and machined in two halves which, when joined, form a cavity 590. The two halves may be joined by any suitable means, for example, with machine screws. The cavity 590 has a rear portion filled by sealing material 550. The sealing material 550 may comprise any suitable substance, such as an epoxy resin. The electrical signal conducting line 500, connected to the transducer 300, is embedded in the sealing material 550 and passes therethrough to a microprocessor, as previously described.

The mounting pin 240 has upstream and downstream pressure conveying passages 570, 580, respectively, formed therein. These passages may be formed in a manner similar to that of the cavity 590, that is, the pin 240 may be cast and machined in two halves which form these passages when joined. An upstream end 310 of the upstream passage 570 communicates with the region in the channel 160 upstream of the obstruction assembly 120 (the higher pressure region). Likewise, an upstream end 320 of the downstream passage 580 communicates with the region downstream of the obstruction assembly 120 (the lower pressure region). The upstream and downstream passages 570, 580 communicate at their downstream ends with the pressure transducer 300. The upstream passage 570 communicates with the higher pressure side of the pressure transducer 300. The downstream passage 580 communicates with the lower pressure side of the pressure transducer 300. Accordingly, the upstream pressure passage 570 conveys the higher of the two pressures reaching the transducer 300. To prevent fluid leakage and pressure loss, the mounting pin 240 may be fashioned with an annular groove 594 in the cavity 590 surrounding the downstream end of the upstream pressure passage 570 and accomodating an O-ring 560.

The flow obstruction assembly 120 of the third exemplary embodiment further includes a rigid member III comprising upstream and downstream portions. The flexible member 210 is mounted on the upstream portion. The downstream portion has a lateral span sufficient to support and limit the curvature of the flexible member 210 when the latter flexes downstream at high flow rates. The rigid member III may comprise, for example, any suitably fashioned element of a rounded leading edge plan form having a generally U-shaped cross-section. Thus, the rigid member III may have a parabolic or semi-elliptical configuration in plan. In the embodiment illustrated, the rigid member III has a semi-cylindrical configuration with an upstream surface having a semi-circular contour in a horizontal section, as shown in FIG. 4. The upstream surface has a rounded bight 220 and rear surfaces 230 recede downstream from the bight 220. The rear surfaces 230 are analogous to the legs 23 of the rigid plate 20 of the first embodiment, that is, the two rear surfaces 230 recede downstream from the bight 220 at a generally oblique angle to the direction of flow. Thus, the rear surfaces 230 brace the flexible member 21 when the latter is deflected by a flow having a velocity greater than a predetermined velocity.

The flexible member 210 is securely mounted to the bight 220 of the rigid member III by a clamping bar 530 and mounting screws 540. The rigid member III is mounted on the mounting pin 240 by the same mounting screws 540 which secure the flexible member 210 to the rigid member III. For this purpose, the mounting screws 540 pass through the rigid member III and into the mounting pin 240. In the exemplary embodiment, in accordance with another aspect of the invention, spacers 510, comprising, for example, spacing washers, are disposed between the rigid member III and the mounting pin 240 to provide a gap 520 of predetermined dimension therebetween. Alternatively, any suitable construction providing a gap between the rigid member III and the mounting pin 240 may be used. For example, at least one member may be formed with a raised or recessed portion in a cooperating surface, the raised or recessed portion cooperating with an opposing contacting surface on the other member when the two are joined to provide a gap between the members.

The upstream and downstream pressure passages 570, 580 in the mounting pin 240 intercept the gap 520, thus providing a linking arrangement. The upstream and downstream pressure passages 570, 580 are thus linked in fluid communication with one another by the portion of the gap 520 lying generally between them. The upstream pressure passage 570 extends beyond the gap 520 through the rigid member III, the flexible member 210, and the clamping bar 530 and has an upstream end terminating in an upstream aperture 310, as shown in FIG. 4. The upstream aperture 310 is located at the bight 220 of the rigid member III and allows communication of the upstream passage 570 with the higher pressure region in the channel 160.

The gap is preferably sized with two operating modes in mind, i.e., a normal operating mode during which the pressure differential imposed across the pressure transducer 300 is within a predetermined range and a pressure surge mode when pressure surges traveling along the fluid stream create a pressure differential of brief duration exceeding the design limits of the transducer 300.

The gap should be dimensioned such that the rigid member and the passage extending through the mounting pin define two portions of one upstream high pressure passage 570. With the gap appropriately configured, the linking arrangement provides sufficiently direct communication between the rigid member portion and the mounting pin portion of the upstream passage 570 so that the pressure along the member and pin portions is essentially constant in the normal mode.

During high pressure surge conditions, the linking arrangement controls the pressure differential imposed across the high and low pressure sides of the pressure transducer. For this purpose, the gap 520 alleviates the pressure differential between the upstream and downstream pressure passages 570, 580 as follows. Excessive pressure is conducted through one of the passages 570, 580 when a pressure surge propagates up or down the fluid stream. This may occur, for example, due to the sudden closing of valves in the fluid stream. During the surge mode, excessive pressure in either of the two passages 570, 580 is eelieved through the appropriately dimensioned gap 520 due to fluid communication between the upstream and downstream passages 570, 580. Thus, during large pressure surges, excess pressure is distributed from one passage to the other through the gap 520. Because the excessive pressure is distributed to both the passages, the differential which would otherwise occur between the two passages is reduced. This arrangement protects the transducer 300 from large pressure differentials and allows the use of a less expensive transducer having a smaller pressure differential design range.

Although the present invention has been described in terms of three exemplary embodiments, it is not limited to these embodiments. Alternative embodiments and modifications which would still be encompassed by the invention may be made by those skilled in the art, particularly in light of the forgoing teachings. For example, rather than a gap intercepting both the upstream and downstream passages to provide a linking means, the upstream and downstream passages may be linked by a third appropriately sized passage in fluid communication with each. Therefore, the following claims are intended to cover any alternative embodiments, modifications, or equivalents which may be included within the spirit and scope of the invention as defined by the claims.

I claim:

1. A fluid flow sensing device for use with a pressure transducer comprising:
   a housing having an inlet and an outlet and defining a fluid flow channel between the inlet and the outlet;
   a first member disposed in the fluid flow channel and including at least one rigid portion;
   a second member disposed in the fluid flow channel upstream from the first member and including at least one flexible portion, said flexible portion being elastically flexible between an initial position spaced from the rigid portion and defining a first effective flow area and a final position adjacent the rigid portion and defining a second effective flow area which exceeds the first effective flow area;
   communicating means comprising first and second fluid pressure conveying passages in fluid communication with the pressure transducer for conveying first and second pressures to the pressure transducer from locations upstream and downstream of said second member, respectively, whereby the differential pressure resulting from fluid flow past said second member may be sensed; and
   a passage linking means linking said first and second passages to allow fluid communication therebetween.

2. A fluid flow sensing device for use with a pressure transducer comprising:
   a housing having an inlet and an outlet and comprising a wall defining a fluid flow channel between the inlet and the outlet;
   a flow obstruction assembly symmetrically mounted to the housing wall and including a generally U-shaped rigid member symmetrically mounted in the center of the housing, said U-shaped rigid member having a bight portion lying generally normal to the direction of flow and rear surfaces extending downstream from the bight portion in a direction generally oblique to the direction of flow, said flow obstruction assembly further having a flexible member attached to the bight portion of the U-shaped rigid member, said flexible member being mounted symmetrically within the channel generally normal to the direction of flow and having a periphery spaced from a periphery of the channel;
   communicating means comprising first and second fluid pressure conveying passages in fluid communication with the pressure transducer for conveying first and second pressures to the pressure transducer from locations upstream and downstream of said flow obstruction assembly, respectively, whereby the differential pressure resulting from fluid flow past said flow obstruction assembly may be sensed; and
   a passage linking means linking said first and second passages to allow fluid communication therebetween.

3. The fluid flow sensing device of claim 2 in which the transducer is housed within said flow obstruction assembly and said passages are formed within said assembly.

4. The fluid flow sensing device of claim 3 in which said first passage intercepts an upstream surface of said flexible member at the center of the upstream surface, said first passage having an axis which is parallel to the flow direction at the point of intersection, and in which said second passage intercepts a surface of said obstruction assembly downstream of said flexible member.

5. The fluid flow sensing device of claim 3 in which said obstruction assembly includes a mounting pin symmetrically mounted in said housing and a spacing means to hold said mounting pin and said U-shaped member in set apart relation in the flow direction to form a gap therebetween lying in a generally cross-flow direction, said first and second passages each intercepting said gap so that said gap includes said linking means.

6. The fluid flow sensing device of claim 3 in which said obstruction assembly includes a mounting pin mounted in said housing, said mounting pin housing the transducer whereby said passages are formed within said mounting pin.

7. The fluid flow sensing device of claim 6 in which said obstruction assembly comprises mounting means mounting said U-shaped member in spaced relation in the flow direction to said mounting pin whereby said U-shaped member and said mounting pin define a gap therebetween, said gap extending in a cross-flow direction between the U-shaped member and the mounting pin, said first and second passages intercepting said gap whereby a portion of said gap comprises said linking means.

8. The fluid flow sensing device of claim 7 in which said gap is of a predetermined dimension, said gap providing fluid communication between said first and second passages during pressure surges in said channel whereby the pressure differential conveyed to the pressure transducer by said first and second passages is controlled.

9. A fluid flow sensing device for use with a pressure transducer comprising:
a housing having an inlet and an outlet and defining a fluid flow channel between the inlet and the outlet;
a flow obstruction assembly mounted to the housing and including a first member disposed in the fluid flow channel and having at least one rigid portion and a second member disposed in the fluid flow channel upstream from the first member and having at least one flexible portion, said flexible portion being elastically flexible between a first position in which the second member is generally spaced from the the rigid portion and the periphery of the second member is generally spaced from the periphery of the channel to define a first fluid flow area when no fluid is flowing in the channel and a second position in which the second member is generally adjacent the rigid portion and the periphery of the second member is generally spaced from the periphery of the channel to define a second fluid flow area larger than said first fluid flow area when fluid is flowing in the channel at a velocity greater than a predetermined velocity;
communicating means comprising first and second fluid pressure conveying passages in fluid communication with the pressure transducer for conveying first and second pressures to the pressure transducer from locations upstream and downstream of said second member, respectively, whereby the differential pressure resulting from fluid flow past said second member may be sensed; and
a passage linking means linking said first and second passages to allow fluid communication therebetween.

10. The fluid flow sensing device of claim 9 in which said first member includes means for limiting the curvature of said flexible portion of said second member in the final position whereby failure due to fatigue of said flexible portion is delayed.

11. The fluid flow sensing device of claim 10 in which said first member comprises a rounded element being generally U-shaped in a plan section.

12. The fluid flow sensing device of claim 9 in which said second member comprises a flexible disc.

13. The fluid flow sensing device of claim 9 in which said flexible portion of said second member lie generally normal to the direction of flow in the intial position.

14. The fluid flow sensing device of claim 9 in which the transducer is housed within said flow obstruction assembly and said passages are formed within said assembly.

15. The fluid flow sensing device of claim 14 in which said first passage intercepts an upstream surface of said second member at the center of the upstream surface, said first passage having an axis which is parallel to the flow direction at the point of intersection and in which said second passage intercepts a surface of said obstruction assembly downstream of said flexible member.

16. The fluid flow sensing device of claim 14 in which said flow obstruction assembly includes a mounting pin symmetrically mounted in said housing and a spacing means to hold said mounting pin and said first member in set apart relation in the flow direction to form a gap therebetween lying in a generally cross-flow direction and said first and second passages each intercept said gap to that said gap includes said linking means.

17. The fluid flow sensing device of claim 16 in which said gap is of a predetermined dimension, said gap providing fluid communication between said first and second passages during pressure surges in said channel whereby the pressure differential conveyed to the pressure transducer by said first and second passages is controlled.

* * * * *